United States Patent
Karppi et al.

(10) Patent No.: US 9,580,865 B2
(45) Date of Patent: Feb. 28, 2017

(54) METHOD FOR DISSOLVING CATIONIC STARCH, PAPERMAKING AGENT AND ITS USE

(71) Applicant: KEMIRA OYJ, Helsinki (FI)

(72) Inventors: Asko Karppi, Turku (FI); Esko Tirronen, Espoo (FI)

(73) Assignee: Kemira OYJ, Helsinki (FI)

( * ) Notice: Subject to any disclaimer, the term of this patent is extended or adjusted under 35 U.S.C. 154(b) by 193 days.

(21) Appl. No.: 14/387,369

(22) PCT Filed: Mar. 22, 2013

(86) PCT No.: PCT/FI2013/050323
§ 371 (c)(1),
(2) Date: Sep. 23, 2014

(87) PCT Pub. No.: WO2013/140046
PCT Pub. Date: Sep. 26, 2013

(65) Prior Publication Data
US 2015/0068697 A1    Mar. 12, 2015

(30) Foreign Application Priority Data

Mar. 23, 2012 (FI) .................................. 20125334

(51) Int. Cl.
| | | |
|---|---|---|
| C08L 79/02 | (2006.01) | |
| C08L 3/00 | (2006.01) | |
| D21H 17/29 | (2006.01) | |
| D21H 17/45 | (2006.01) | |
| D21H 17/54 | (2006.01) | |
| D21H 21/10 | (2006.01) | |
| C08L 3/08 | (2006.01) | |
| D21H 17/37 | (2006.01) | |
| D21H 17/44 | (2006.01) | |
| D21H 17/55 | (2006.01) | |
| D21H 17/56 | (2006.01) | |
| D21H 21/06 | (2006.01) | |
| D21H 21/18 | (2006.01) | |
| C08G 73/02 | (2006.01) | |

(52) U.S. Cl.
CPC ............. D21H 17/29 (2013.01); C08L 3/08 (2013.01); C08L 79/02 (2013.01); D21H 17/375 (2013.01); D21H 17/44 (2013.01); D21H 17/45 (2013.01); D21H 17/455 (2013.01); D21H 17/54 (2013.01); D21H 17/55 (2013.01); D21H 17/56 (2013.01); D21H 21/06 (2013.01); D21H 21/10 (2013.01); D21H 21/18 (2013.01); C08G 73/022 (2013.01); C08G 73/0286 (2013.01); C08G 73/0293 (2013.01)

(58) Field of Classification Search
USPC ....................... 162/158, 164.1, 164.3, 164.6, 162/168.1–168.3, 175; 524/1, 27, 47, 52; 106/162.1, 206.1, 214.1, 214.2
See application file for complete search history.

(56) References Cited

U.S. PATENT DOCUMENTS

| | | | | |
|---|---|---|---|---|
| 3,212,962 A | * | 10/1965 | Reynolds ............... | D21H 19/12 162/168.1 |
| 4,643,801 A | | 2/1987 | Johnson | |
| 5,338,406 A | | 8/1994 | Smith | |
| 5,858,174 A | * | 1/1999 | Persson ................... | C08L 33/26 162/164.1 |
| 5,859,128 A | * | 1/1999 | Moffett .................. | C08B 31/00 525/54.2 |
| 8,304,533 B2 | * | 11/2012 | Karppi .................. | C08B 31/006 162/175 |
| 8,444,818 B2 | * | 5/2013 | Sutman .................. | D21H 17/29 162/158 |
| 8,936,698 B2 | * | 1/2015 | Karppi .................. | D21H 21/02 162/164.3 |
| 2007/0151688 A1 | | 7/2007 | Solhage et al. | |
| 2010/0282425 A1 | | 11/2010 | Karppi et al. | |
| 2011/0247775 A1 | | 10/2011 | Sutman et al. | |

FOREIGN PATENT DOCUMENTS

| | | |
|---|---|---|
| CN | 1278283 A | 12/2000 |
| CN | 101351595 A | 1/2009 |
| GB | 2063282 A | 6/1981 |

OTHER PUBLICATIONS

"Starch", Ullmann's Encyclopedia of Industrial Chemistry, 2012, vol. 34, pp. 113-116.*
Search Report for CN 201380014484.9 mailed Sep. 1, 2015.
Translation of the Abstract for CN 101351595 published Jan. 21, 2009.
Translation of the Abstract for CN 1278283 published Dec. 27, 2000.
Hellwig, Georg, et al., "Production of Cationic Starch Ethers using an Improved Dry Process"; Starch/Starke, 44, vol. 2, pp. 69-74, 1992.

* cited by examiner

*Primary Examiner* — Dennis Cordray
(74) *Attorney, Agent, or Firm* — Thomas | Horstemeyer, LLP

(57) ABSTRACT

The invention relates to a method for dissolving cationic starch. In the method is obtained an aqueous polyelectrolyte solution comprising a synthetic cationic polymer, which has a charge density value of at least 0.1 meq/g, determined at pH3, the concentration of the cationic polymer in the polyelectrolyte solution being >2.5 weight-%, and the aqueous polyelectrolyte solution is brought together with cationic starch having a degree of substitution, DS, >0.1. The cationic starch is dissolved to the polyelectrolyte solution by heating and/or mixing. The invention relates also to a papermaking agent comprising 2-40 weight-% of synthetic cationic polymer which has a charge density value of at least 0.1 meq/g, determined at p H 3, and 2.5-25 weight-% cationic starch having degree of substitution, DS, >0.1. The papermaking agent is in slurry form and has a viscosity of 50-20 000 m Pas, measured at 25° C. with Brookfield DVI+ viscometer.

16 Claims, No Drawings

METHOD FOR DISSOLVING CATIONIC STARCH, PAPERMAKING AGENT AND ITS USE

CROSS-REFERENCE TO RELATED APPLICATIONS

This application is the 35 U.S.C. §371 national stage of PCT Application No. PCT/FI2013/050323, filed Mar. 22, 2013, which is herein incorporated by reference in its entirety and which also claims priority to, and the benefit of, Finnish Patent Application No. 20125334, filed Mar. 23, 2012, which is herein incorporated by reference in its entirety.

The invention relates to a method for dissolving cationic starch, a papermaking agent and its use according to preambles of the enclosed claims.

Cationic starches are well known agents in papermaking. They are mainly used in the wet end of the paper machine, where they are added to the fibre stock before the paper machine headbox. For example, they may be used as dry strength and/or anti-dusting agents, or as components in retention compositions.

Commercial cationic starches are normally in moist powder form and have typically a degree substitution, DS, <0.055, i.e. they are low cationic starches. Low cationic starch is not soluble in cold water, but form low viscous slurry when mixed with water. The formed slurry is relatively easy to pump. In order to make low cationic starch suitable for use in papermaking, it is usually mixed with water and the mixture is then cooked by using either jet cooking or pot cooking methods. For example, in jet cooking starch mixture is introduced into a jet cooker with steam. The cooking temperature in the cooker varies between 120-160° C., depending on the starch type. The cooking process time is typically around 1 to 2 minutes. Cooked starch is collected to a tank after steam separation and it may be considered as properly dissolved starch.

Cationic starches, which have a degree of substitution, DS, >0.1 are considered high cationic starches and they are relatively soluble in cold water. High cationic starches with degree of substitution >0.15 are readily soluble in cold water. However, these starches are difficult to dissolve, especially in large quantities, as they start to dissolve in water immediately, and part of the starch is already dissolved before all starch have not yet even entered the mixture. The result is that they easily form lumps of different size, instead of uniformly dissolving. They also often form with water, at industrially feasible concentrations, viscous gel-like masses, which are difficult, or even impossible to mix with normal existing agitating means in mixing tanks. Therefore typical used starch concentrations are relatively low, less than 5 weight-%. In addition, transfer of such viscous gels is not possible with normal pumping equipment. Thus, high cationic starches are not suitable for conventional starch dissolving techniques employing jet cooking or pot cooking. Complicated dissolving procedures employing, for example, powder dissolving units or high-shear mixers, are required for dissolving high cationic starches, which have made the handling of industrial scale volumes of high cationic starch difficult, if not impossible.

Highly cationic starches would, however, provide advantages if they could conveniently be used in papermaking. Therefore a simple and easy method for properly dissolving cationic starches is needed in order to enable their use in industrial scale applications.

One object of this invention is to minimise or even eliminate the disadvantages in the prior art.

One object of the invention is also to provide simple and economical method for properly dissolving high cationic starches in large quantities.

Another object of the present invention is to provide a papermaking agent comprising high cationic starch.

These objects are attained with the invention having the characteristics presented below in the characterising parts of the independent claims.

All the described embodiments and advantages apply both for the compositions and the processes according to the present invention, when applicable, even if not always explicitly stated so.

Typical method according to the present invention for dissolving cationic starch comprises
  obtaining an aqueous polyelectrolyte solution comprising a synthetic cationic polymer, which has a charge density value of at least 0.1 meq/g, determined at pH 3, the concentration of the synthetic cationic polymer in the polyelectrolyte solution being >2.5 weight-%,
  bringing the aqueous polyelectrolyte solution together with cationic starch having a degree of substitution (DS)>0.1, and
  dissolving the cationic starch to the polyelectrolyte solution by heating and/or by mixing.

Typical papermaking agent according to the present invention for making of paper, board or the like comprises
  2-40 weight-% of synthetic cationic polymer which has a charge density value of at least 0.1 meq/g, determined at pH 3,
  2.5-25 weight-% cationic starch having degree of substitution, DS, >0.1, whereby
the papermaking agent is in form of a solution and has a viscosity of 50-20 000 mPas, measured at 25° C. with Brookfield DVI+ viscometer. The weight-% values of the cationic polymer and starch in the papermaking agent are calculated on basis of total weight of the papermaking agent.

Typical use of a papermaking agent according to the present invention is as deposit control agent, retention agent or dry strength agent.

Now it has been surprisingly found out that when non-dissolved cationic starch having degree of substitution (DS) >0.1 is brought together with a polyelectrolyte solution and dissolved by heating and/or by mixing, the resulting mixture is homogenous mixture and has typically a low or moderate viscosity value. The resulting starch-polyelectrolyte mixture is homogenous and it may be transferred by using existing pumping equipment and pipelines, without danger of jamming or clogging. The resulting mixture, comprising cationic starch and polyelectrolyte is also suitable to be handled by using common starch cooking techniques for dissolving cationic starch. This makes the dissolving of high cationic starch, especially high cationic non-degraded starch, much easier and faster than before. It is also possible to use existing starch cooking equipment, whereby additional investment costs may be avoided.

According to one embodiment of the invention the papermaking agent comprises
  2.5-40 weight-%, typically 2.5-30 weight-%, preferably 5-25 weight-%, more preferably 7.5-20 weight-%, most preferably 7.5-19.5 weight-%, of synthetic cationic polymer, and
  2.5-25 weight-%, preferably 5-23 weight-%, more preferably 7.5-20 weight-%, most preferably 7.5-19.5 weight-%, of cationic starch. The weight-% values of the cationic polymer and starch in the papermaking agent are calculated on basis of total weight of the papermaking agent.

According to one embodiment of the invention the concentration of cationic polymer in the polyelectrolyte solution, before the polyelectrolyte solution is brought together, e.g. by mixing, with cationic starch, is >2.5 weight-%, preferably >5 weight-%, more preferably 7.5 weight-%, still more preferably >10 weight-%. The concentration of the cationic polymer in the aqueous polyelectrolyte solution, before the polyelectrolyte solution is brought together, e.g. by mixing, with cationic starch, is typically in the range of 2.5-40 weight-%, preferably 5-35 weight-%, more preferably 7.5-30 weight-%, still more preferably 10-25 weight-%. The concentration values are calculated on basis of total dry solids of the polyelectrolyte solution. Increase in the concentration of the cationic polymer in the polyelectrolyte solution improves the viscosity of the resulting mixture. It has been even noticed that a polymer concentration around or over 15 weight-% results in a mixture, which comprises cationic starch and synthetic polymer, and which may have a low viscosity <500 mPas for several hours. When lower concentration of cationic polymer is used, e.g. concentrations around 2.5-5 weight %, the resulting mixture is still homogenous and fluid, even if it sometimes may be relatively viscous, but it can still be handled by conventional pumps, such as progressive cavity pumps, a.k.a. "Mohno pumps".

According to one embodiment of the invention the papermaking agent comprises a cationic polymer, which is a copolymer of dialkylamine(s) and epichlorohydrin; polydiallyldimethylammonium chloride (poly-DADMAC); poly-acrylamide-N-propyltrimethylammonium chloride (poly-APTAC); polymethacrylamide-N-propyltrimethylammonium chloride (poly-MAPTAC); polyamidoamine epichlorohydrin resin; polyethyleneimine; polyvinylformamide/polyvinylamine; cationic polyacrylamide, such as a copolymer of acrylamide and DADMAC, APTAC and/or MAPTAC; or any mixture of the said polymers.

According to one embodiment of the invention the polyelectrolyte solution comprises a synthetic cationic polymer, which is a copolymer of dialkylamine(s) and epichlorohydrin, such as a copolymer of dimethylamine and/or diethylamine and epichlorohydrin. The co-polymer of dialkylamine(s) and epichlorohydrin may be linear or cross-linked. Further, the polyelectrolyte solution may alternatively comprise a synthetic cationic polymer, which is polydiallyldimethylammonium chloride (poly-DADMAC), polyacrylamido-N-propyltrimethylammonium chloride (poly-APTAC), polymethacrylamido-N-propyltrimethylammonium chloride (poly-MAPTAC), polyamidoamine epichlorohydrin resin (PAAE-resin), polyethyleneimine, polyvinylformamide/polyvinylamine. Polyvinylformamide/polyvinylamine may be hydrolysed between 5-100%. Synthetic cationic polymers are typically used in liquid form.

According to another embodiment of the invention the polyelectrolyte solution comprises a synthetic cationic polymer, which is cationic hydrolytically stable polyacrylamide (CPAM) in liquid form, for example a copolymer of DADMAC and acrylamide, a copolymer of APTAC and acrylamide, a copolymer of MAPTAC and acrylamide, or a copolymer of acrylamide and diallyldimethylammonium chloride (DADMAC), acrylamido-N-propyltrimethylammonium chloride (APTAC) and/or methacrylamido-N-propyltrimethylammonium chloride (MAPTAC). Cationicity of the cationic polyacrylamide is >1 mol-%, preferably >3 mol-%, more preferably >5 mol-%. Cationicity of the cationic polyacrylamide may be in the range of 1-50 mol-%, preferably 3-40 mol-%, more preferably 5-20 mol-%.

According to one preferred embodiment of the invention the synthetic cationic polymer is a copolymer of dimethylamine and epichlorohydrin, either linear or cross-linked. The cross-linker agent may be alkylenediamine, dialkylene triamine or the like. More preferably the synthetic cationic polymer is a copolymer of dimethylamine and epichlorohydrin, cross-linked with ethylenediamine. According to one embodiment of the invention synthetic cationic polymer comprises about equimolar amounts of epichlorohydrin and dimethylamine, and 0.2-3 mol-% of ethylenediamine as crosslinker agent.

According to one embodiment of the invention the aqueous polyelectrolyte solution comprises a synthetic cationic polymer, which has a charge density value of about 0.1-23 meq/g, preferably about 0.2-13 meq/g, more preferably about 0.3-10 meq/g, determined at pH 3. According to one embodiment of the invention an aqueous polyelectrolyte solution comprises a synthetic cationic polymer, which has a charge density value of 0.1-23 meq/g, preferably 0.2-13 meq/g, more preferably 0.3-10 meq/g, determined at pH 3. Charge density of a synthetic cationic polymer is determined by charge titration, using Mütek titration method and standard polymers as titration standard, as described in the experimental section of this application.

The synthetic cationic polymer may typically have an average molecular weight MW in the range of 1 000-2 500 000 Dalton, preferably 5 000-2 000 000, more preferably 10 000-1 500 000 Dalton, the most preferably 50,000-1,000,000 Dalton. The average molecular weights are determined by using known gel chromatography methods.

In the context of the present application the term "cationic starch" means starch which has been modified by cationisation. The cationic starch in the present invention is in non-dissolved form, typically in form of a moist powder and/or moist particulate material before it is brought together with the polyelectrolyte solution. For example, the percentage of moisture in a moist starch powder may be up to 30-40%. Dry solids content of undissolved cationic starch in non-dissolved, moist powder form may be >60 weight-%, preferably >70 weight-%, more preferably >75 weight-%, most preferably >80 weight-%. According to one embodiment suitable botanical starches are, for example, selected from a group comprising potato starch, rice starch, corn starch, waxy corn starch, wheat starch, barley starch, sweet potato starch and tapioca starch, potato starch being preferred.

Suitable starches preferably have an amylopectin content >70%, preferably >75%. According to one embodiment of the invention the cationic starch is preferably non-degraded and/or free of cross-linkages.

Starch may be cationised by any suitable method. Preferably starch is cationised by using 2,3-epoxypropyltrimethylammonium chloride or 3-chloro-2-hydroxypropyltrimethylammonium chloride. It is also possible to cationise starch by using cationic acrylamide derivatives, such as acrylamido-N-propyltrimethylammonium chloride (APTAC).

Cationicity of cationic starch may be defined by using degree of substitution (DS). Degree of substitution defines how many substituted groups are contained in cationic starch, calculated per one anhydroglucose unit of starch. Degree of substitution of cationic starch, which is cationised with 2,3-epoxypropyltrimethylammonium chloride, is typically calculated by using the nitrogen content of pure dry cationic starch, which does not contain any other nitrogen sources than the quaternary ammonium groups. Nitrogen content is typically determined by using commonly known Kjeldahl-method. Degree of substitution of cationic starch, which is cationised with 2,3-epoxypropyltrimethylammonium chloride may be calculated by using the following equation:

$$DS=(162 \times N\text{-}\%)/(1400-(N\text{-}\%\times 151.6),$$

where 162 is the molecular weight of an anhydroglucose unit (AHG), N-% is the nitrogen value in %, 1400 is the molecular weight of nitrogen multiplied by 100 and 151.5 is the molecular weight of 2,3-epoxypropyltrimethylammonium chloride. According to one embodiment of the invention cationic starch has a degree of substitution, DS, in the range from 0.1 to 1.0, preferably from 0.11 to 0.7, more preferably from 0.12 to 0.5, most preferably from 0.13 to 0.3.

The concentration of cationic polymer in the polyelectrolyte solution, before forming the mixture of the starch and the solution, is dependent on and selected according to the cationicity, i.e. degree of substitution, of the starch. For example, suitable concentration of cationic polymer may be >2.5% for cationic starch having degree of substitution DS from 0.1 to 0.15; >5% for cationic starch having degree of substitution DS from 0.15 to 0.2; >7.5% for cationic starch having degree of substitution DS from 0.2 to 0.3; >10% for cationic starch having degree of substitution DS>0.3.

The cationic starch may have a charge density of 0.56-3.2 meq/g pure cationic starch, preferably 0.62-2.6 meq/g pure cationic starch, more preferably 0.67-2.1 meq/g pure cationic starch, most preferably 0.72-1.45 meq/g pure cationic starch. Charge density for cationic starch is determined by using following equation:

$$\text{Charge density}=(N\text{-}\%*10)/14$$

where N-% is the nitrogen value in %, determined by using Kjeldahl-method and 14 is the molecular weight of nitrogen.

Cationic starch may be degraded or non-degraded. Degraded starch is obtained by subjecting the cationic starch to oxidative, thermal, acidic or enzymatic degradation, oxidative degradation being preferred. Hypochlorite, peroxodisulphate, hydrogen peroxide or their mixtures may be used as oxidising agents. According to one preferred embodiment of the invention the starch, which is used, is cationic starch, where at least 75 weight-% of the starch material has an average molecular weight (MW) over 5,000,000 Dalton, preferably over 7,500,000 Dalton, more preferably over 10,000,000 Dalton. The average molecular weight is determined by using known gel chromatography methods.

In case degraded cationic starch is used, it is preferred that the concentration of the synthetic cationic polymer in the polyelectrolyte solution may be >5 weight-%, before the starch is brought together with the polyelectrolyte solution.

In one embodiment of the invention the backbone of the starch is preferably not degraded or not cross-linked. Suitable cationic non-degraded starches are disclosed for example in EP 2192228. Some cationic non-degraded starches having suitable properties are also disclosed in GB 2063282, or in article by Hellwig et al.: Production of Cationic Starch Ethers Using an Improved Dry Process, Starch/Stärke 44 (1992) 69-74.

In one embodiment of the invention the cationic starch is dispersed first into the polyelectrolyte solution in order to prevent formation of viscous gel lumps. The temperature of the polyelectrolyte solution may vary in the range of 0-45° C. Preferably the temperature of the polyelectrolyte solution is adjusted to a temperature <40° C., preferably <30° C. before addition of cationic starch. Typically the temperature of the polyelectrolyte solution is adjusted to 10-30° C. When the cationic starch is dispersed into the polyelectrolyte solution the resulting mixture remains homogenous and fluid. The viscosity of the resulting mixture remains also at the suitable level, so that the mixture may be agitated with conventional industrial agitators and transferred with conventional pumps, such as Mohno-pumps. Thus the resulting starch-polyelectrolyte mixture may be easily handled also in large quantities.

According to one preferred embodiment of the invention the viscosity of the resulting mixture obtainable by the method according to the present invention remains at the level of 5-50 000 mPas, preferably 10-10 000 mPas, more preferably 15-5000 mPas, measured at 25° C. with Brookfield RVI+ viscometer, equipped with Small Sample Adapter (SSA) with spindle 18 or spindle 31. Spindle 18 is used for mixtures with viscosity value with 5-500 mPas and spindle 31 for mixtures with viscosity values >500 mPas. Maximum possible rotation speed of the spindle is used. The viscosity of the resulting mixture stays within the above defined limits at least for 30 minutes, preferably at least for 60 minutes, more preferably at least for 90 minutes, most preferably at least for 120 minutes, often even at least for 180 minutes, which is typically an adequate time for practical manufacturing applications.

High cationic starch, which is dispersed into the polyelectrolyte solution, may be dissolved by conventional cooking techniques, which are commonly used for dissolving low cationic starches, such as jet cooking or pot cooking. These cooking techniques are known as such for a person skilled in the art, and they are not explained here in detail. According to one embodiment of the invention cationic starch is dissolved to the polyelectrolyte solution by heating by using steam cooking, such as jet cooking, at temperature of 110-180° C., or by using pot cooking, for example at temperature >90° C.

The papermaking agent according to one embodiment of the invention has typically a viscosity in the range of 50-20 000 mPas, preferably 100-10 000 mPas, more preferably 200-5000 mPas, measured at 23° C. with Brookfield RVI+ viscometer, equipped with Small Sample Adapter (SSA) with spindle 18 or spindle 31. Spindle 18 is used for mixtures with viscosity value with 5-500 mPas and spindle 31 for mixtures with viscosity values >500 mPas. Maximum possible rotation speed of the spindle is used. If the chosen rotation speed is too fast, the measurement yields no results.

Typically the pH of the paper making agent comprising cationic starch and cationic polymer is in the range 3-9, preferably 4-8.

The papermaking agent is typically homogenous in the sense it passes 300 mm filter at 3 bar pressure, e.g. the agent is pumper through industrial 300 mm wire filter by using 3 bar pressure.

According to one embodiment of the invention the papermaking agent is used in amount of 50-5000 g/ton paper, preferably 100-3000 g/ton paper, more preferably 200-2000 g/ton paper and the most preferably 250-1500 g/ton paper.

EXPERIMENTAL

The following non-limiting examples illustrate some embodiments of the present invention.

In the following experiments the DS values of cationic starches is determined based on the bound nitrogen content, which is determined from purified starch samples.

The purification of starch samples is performed as follows:

5 g of cationic starch sample is slurried with 250 ml solvent, comprising 70 weight-% of ethanol and 30 weight-% of deionised water. Obtained slurry is agitated with magnetic stirrer for 2 h. The slurry is filtered and the starch filter cake is collected. The slurrying, agitation and filtering stages are repeated twice. Then the purified starch is dried in an oven at 115° C. for 20 h. Nitrogen content of the purified sample is determined by Kjeldahl-method.

In the following experiments the charge densities of synthetic cationic polymers are determined by Mütek PCD 03 pH particle charge detector, equipped with Mütek PCD T3 PDC Titrator three, and by using 0.001 N sodium poly-ethylenesulphonate as a titrant. Charge densities are calculated as meq/g dry product.

Experiment 1

Making of aqueous mixture of cationic starch and polyelectrolyte solution comprising a co-polymer of dimethylamine and epichlorohydrin, cooking of the mixture The following materials are used in the Experiment 1:

Starch, S1: cationic amylopectin potato starch powder, dry substance content 85.4%, N-content 1.45%, pH 6.6 (10% aq. sol), calculated charge density 1.0 meq/g.

Synthetic cationic polymer, P1: aqueous solution of co-polymer of dimethylamine and epichlorohydrin, dry substance content 50.4%, viscosity 710 mPas, pH 4.8, determined charge density 7.3 meq/g dry product at pH 3, determined as described above.

59.5 g aqueous solution of synthetic cationic polymer P1 and 205 g deionized water is mixed in a reactor equipped with mechanical agitator and a water bath for heating in order to obtain a polyelectrolyte solution. The polyelectrolyte solution is agitated with anchor type agitator with rotation speed of 300 rpm. Temperature of the water bath and the solution is 25° C. Then 35.1 g starch powder S1 is mixed into the polyelectrolyte solution and low viscous mixture is formed. Water bath is then heated from 25° C. to 98° C., which takes about 15 min. Temperature of the mixture in the reactor increases from 25° C. to 95° C. in about 30 min. When temperature of the mixture increases, the viscosity also increases and the cloudy appearance starts to turn into transparent solution. When the temperature has reached 95° C., the mixture is agitated for 30 min. Evaporated water is replaced with hot deionized water. When the agitation time is completed, the resulting starch/polymer-mixture is dispersed 2 min with Kady LT 2000 rotor-stator high speed dispersion lab mill, using about 60% of the maximum speed at the temperature about 95-100° C. The evaporated water is replaced with deionized water. A yellowish transparent solution is obtained. Dry solids content is 19.4%, viscosity is 480 mPas at 25° C., measured with Brookfield DVI+− viscometer, equipped with SSA with spindle 18, rotation speed 6 rpm, and pH 5.6.

According to Experiment 1 cationic starch can be mixed conveniently by using aqueous polyelectrolyte solution comprising a co-polymer of dimethylamine and epichlorohydrin and then dissolved easily by normal starch cooking procedure.

Experiment 2

Making of aqueous mixture of cationic starch and polyelectrolyte solution comprising polyethyleneimine, cooking of the mixture The following materials are used in the Experiment 2:

Starch, S1: as defined above.

Synthetic cationic polymer, P2: aqueous solution of polyethyleneimine, dry substance content 25.1%, viscosity 420 mPas, pH 8.2, determined charge density 9.9 meq/g dry product at pH 3, determined as described above.

The procedure is similar as in Experiment 1. 120 g aqueous polymer solution polymer P2 and 145 g deionized water is mixed in a reactor equipped with an agitator in order to obtain a polyelectrolyte solution. 35.1 g starch powder S1 is mixed into the polyelectrolyte solution. Low viscous slurry is formed at first and starch is then dissolved using the same heating and agitation procedure as given in Experiment 1. When the dissolving is completed, a yellow transparent solution is obtained. Dry solids content is 19.5%, and viscosity is 800 mPas at 25° C., measured with Brookfield DVI+, spindle 31, rotation speed 30 rpm, and pH 7.8.

According to Experiment 2 cationic starch can be mixed conveniently by using aqueous polyelectrolyte solution comprising polyethyleneimine and then dissolved easily by normal starch cooking procedure.

Experiment 3

Making of aqueous mixture of cationic starch and polyelectrolyte solutions comprising different amounts of co-polymer of dimethylamine and epichlorohydrin The following materials are used in the Experiment 3:

Starch, S1: as defined above.

Synthetic cationic polymer, P1: as defined above.

A series of cationic starch-polymer mixtures with different polymer concentrations are made, see Table 1. Aqueous polyelectrolyte solution comprising polymer P1 is diluted with water at about 25° C. Starch S1 is then dosed into the solution and mixed for 5 min. Viscosity of the resulting mixture is measured. Concentration of cationic starch in the final mixture is 10% in each mixture, except in the mixture 3-6, which does not contain any starch.

TABLE 1

Compositions used in Experiment 3.

| Mixture nb. | P1 dosage (g) | Water (g) | Conc of P1 before S1 dosage (%) | S1 dosage (g) | Total mixture (g) | Viscosity (mPas) | Dry solids (%) |
|---|---|---|---|---|---|---|---|
| 3-1 | 59.5 | 205.3 | 11.3 | 35.1 | 300 | 500 | 19.9 |
| 3-2 | 44.6 | 220.2 | 8.5 | 35.1 | 300 | 2700 | 17.4 |
| 3-3 | 29.8 | 235.1 | 5.7 | 35.1 | 300 | 7500 | 14.9 |
| 3-4 | 14.9 | 250.0 | 2.8 | 35.1 | 300 | 31400 | 12.4 |

TABLE 1-continued

Compositions used in Experiment 3.

| Mixture nb. | P1 dosage (g) | Water (g) | Conc of P1 before S1 dosage (%) | S1 dosage (g) | Total mixture (g) | Viscosity (mPas) | Dry solids (%) |
|---|---|---|---|---|---|---|---|
| 3-5 | 0.0 | 264.9 | 0.0 | 35.1 | 300 | heterogenous gel | not measured |
| 3-6 | 59.5 | 240.5 | 10.0 | 0.0 | 300 | 37 | 10.0 |

S1 = starch,
P1 = synthetic cationic polymer

It can be seen from Table 1 that the amount of cationic polymer has an impact on the solubility of cationic starch. If polymer concentration is less than about 5 weight-%, the viscosity of the resulting mixture increases rapidly. However, even with a polymer concentration of 2.8 weight-% the mixture is homogenous and can be handled with normal pump equipment. The mixture 3-5, which does not contain any polymer, forms a heterogeneous gel, which contains lumps. Such gel is extremely difficult and impractical to handle in large volumes.

Experiment 4

Effect of different cationic polymers in the polyelectrolyte solution on viscosity of the resulting mixture as the function of time The following materials are used in the experiment 4:

Starch, S2: cationic potato starch powder, dry solids content: 87%, N-content 1.55, pH 5.5 (10% aq. solution) calculated charge density 1.1 meq/g.

Synthetic cationic polymers:

P1, P2: as defined above.

P3: aqueous solution of poly-DADMAC, dry solids content 41.2%, viscosity 1800 mPas, pH 4.9, determined charge density 6.8 meq/g dry product at pH 3, determined as described above.

P4: polyvinylamine product, aqueous solution with dry solids content 31.2%, viscosity 420 mPas, degree of hydrolysis 70%, MW average about 100 000 Dalton, pH 9.7, determined charge density 7.0 meq/g dry product at pH 3, determined as described above.

The mixtures are prepared according to Table 2 in the following manner:

Aqueous polyelectrolyte solution is prepared by diluting synthetic cationic polymer with water at about 25° C. Starch is then dosed into the polyelectrolyte solution, pH of the mixture is adjusted between 4.5-7, if necessary, with 25% sulphuric acid and mixed for 5 min, mixing speed 300 rpm. Viscosity of the resulting mixture is measured. The mixture is further mixed, mixing speed 100 rpm. Viscosity of the mixture is measured again after 30 min of mixing and 2 h of mixing. Measured viscosity values are shown in Table 3. Concentration of cationic starch and synthetic polymer is 15% in all mixtures, except in mixture 4-5, which does not contain any polymer.

TABLE 2

Compositions in Experiment 4.

| Mixture nb. | P-product | P-product dosage (g) | Water (g) | Conc of P-product before S2 dosage (%) | S2-dosage (g) | Total mixture (g) | Dry solids of the mixture (%) | pH |
|---|---|---|---|---|---|---|---|---|
| 4-1 | P1 | 89.3 | 159 | 18.1 | 51.7 | 300 | 29.9 | 5.3 |
| 4-2 | P3 | 109 | 139 | 18.1 | 51.7 | 300 | 30.0 | 4.6 |
| 4-3 | P2 | 179 | 69.7 | 18.1 | 51.7 | 300 | 30.0 | 5.9 |
| 4-4 | P4 | 144 | 104 | 18.1 | 51.7 | 300 | 29.9 | 5.3 |
| 4-5 | — | 0 | 248 | 0 | 51.7 | 300 | 15.1 | 4.5 |

TABLE 3

Measured viscosity values for different mixture compositions of Table 2, as function of the agitation time

| Mixture nb. | Viscosity of the mixture (mPas) | Viscosity after 30 min mixing (mPas) | Viscosity after 120 min mixing (mPas) |
|---|---|---|---|
| 4-1 | 1380 | 3200 | 3860 |
| 4-2 | 4200 | 8400 | 14000 |
| 4-3 | 4170 | 6980 | 13800 |
| 4-4 | 6300 | 13700 | 68000 |
| 4-5 | gel | gel | gel |

The results of Table 3 show that synthetic cationic polymers lower the viscosity values of mixtures comprising cationic starch. The effect achieved by using cationic polymer may last up to 2 h, which is long enough time in practice from handling point of view. Even in case where higher viscosity values are obtained, as seen for composition 4-4, the mixture itself is homogenous and can be transferred by suitable pumping equipment. Mixture 4-5, which does not contain any cationic polymer, forms immediately high viscous gel. Viscosity of the formed gel cannot be measured, and mixture 4-5 cannot be easily handled in practice in large quantities.

Experiment 5

Effect of different cationic starches on viscosity of resulting starch-polyelectrolyte mixture as the function of time The following materials are used in the experiment 5:

Starches:

S1, S2: as defined above.

S3: cationic potato starch, dry solids content 84.9%, N-content 1.2%, pH 5.3 (10% aq. solution), calculated charge density 0.86 meq/g.

S4: cationic tapioca starch powder, dry solids content: 88.5%, N-content 1.4, pH 5.5 (10% aq. solution), calculated charge density 1.0 meq/g.

S5: cationic amylopectin potato starch, dry solids 86.2%, N-content 2.0%, pH 6.4 (10% aq. solution), calculated charge density 1.4 meq/g.

Synthetic cationic polymer, P1: as defined above.

The mixtures are prepared according to Table 4 in the following manner:

Aqueous polymer solution of P1 is diluted with water at about 25° C. Starch is then dosed into the obtained polyelectrolyte solution, pH of the solution is adjusted between 4.5-7, if necessary, with 25% sulphuric acid and mixed for 5 min, mixing speed 300 rpm. Viscosity of the mixture is measured. The mixture is further mixed, mixing speed 100 rpm. Viscosity of the mixture is measured again after 30 min of mixing and 2 h of mixing. Measured viscosity values are shown in Table 5.

TABLE 4

Mixtures in Experiment 5.

| Mixture nb. | P-product | P-product dosage (g) | Water (g) | Conc of P before S-product dosage (%) | S-product | S-product dosage (g) | Total mixture (g) |
|---|---|---|---|---|---|---|---|
| 5-1 | P1 | 89.3 | 157.7 | 18 | S3 | 53.0 | 300 |
| 5-2 | P1 | 89.3 | 159.9 | 18 | S4 | 50.8 | 300 |
| 5-3 | P1 | 89.3 | 159.0 | 18 | S2 | 51.7 | 300 |
| 5-4 | P1 | 89.3 | 158.0 | 18 | S1 | 52.7 | 300 |
| 5-5 | P1 | 89.3 | 158.5 | 18 | S5 | 52.2 | 300 |
| 5-6 | — | 0 | 247.0 | 0 | S3 | 53.0 | 300 |
| 5-7 | — | 0 | 249.2 | 0 | S4 | 50.8 | 300 |
| 5-8 | — | 0 | 248.3 | 0 | S2 | 51.7 | 300 |
| 5-9 | — | 0 | 247.3 | 0 | S1 | 52.7 | 300 |
| 5-10 | — | 0 | 247.8 | 0 | S5 | 52.2 | 300 |

TABLE 5

Measured viscosity values for the different mixture compositions of Table 4, as function of the agitation time.

| Mixture nb. | Dry solids of the mixture (%) | pH | Viscosity of the mixture (mPas) | Viscosity after 30 min mixing (mPas) | Viscosity after 120 min mixing (mPas) |
|---|---|---|---|---|---|
| 5-1 | 30 | 4.9 | 73 | 72 | 72 |
| 5-2 | 30 | 5.4 | 106 | 138 | 215 |
| 5-3 | 30 | 5.3 | 1380 | 3200 | 3860 |
| 5-4 | 30 | 5.5 | 71 | 74 | 105 |
| 5-5 | 30 | 5.4 | 1130 | 1430 | 1760 |
| 5-6 | 15 | 4.8 | ~1500 | gel | gel |
| 5-7 | 15 | 5.9 | gel | gel | gel |
| 5-8 | 15 | 4.5 | gel | gel | 37000 |
| 5-9 | 15 | 5.9 | gel | gel | gel |
| 5-10 | 15 | 5.7 | gel | gel | gel |

The results show that cationic polymer significantly decrease the viscosity of mixtures comprising high cationic starches. Mixtures from 5-6 to 5-10, which do not contain any cationic polymer, form immediately high viscous gels. Viscosity of the formed gels cannot be measured, and compositions cannot be easily handled in practice in large quantities.

Experiment 6

Effect of temperature to dissolution speed of starch in starch-polyelectrolyte mixtures The following materials are used in the experiment 6:

Starches, S2, S3: as defined above.

Synthetic cationic polymer, P1: as defined above.

The mixtures are prepared according to Table 6 in the following manner:

Aqueous polymer solution of P1 is diluted with water and heated to a target temperature at about 25° C. or at about 40° C., and kept at the chosen target temperature throughout the whole experiment. Starch is dosed into the obtained polyelectrolyte solution, pH of the mixture is adjusted between 4.5-7, if necessary, with 25% sulphuric acid and mixed for 5 min, mixing speed 300 rpm. Viscosity of the mixture is measured. The mixture is further mixed, mixing speed 100 rpm. Viscosity of the mixture is measured again after 30 min of mixing and 2 h of mixing. Measured viscosity values are shown in Table 7.

TABLE 6

Mixtures in Experiment 6.

| Mixture nb. | P-product | P-product dosage (g) | Water (g) | Conc of P before S-product dosage (%) | Temperature (° C.) | S-product | S-product dosage (g) | Total mixture (g) |
|---|---|---|---|---|---|---|---|---|
| 6-1 | P1 | 89.3 | 157.7 | 18 | 25 | S3 | 53.0 | 300 |
| 6-2 | P1 | 89.3 | 157.7 | 18 | 40 | S3 | 53.0 | 300 |
| 6-3 | P1 | 89.3 | 159.0 | 18 | 25 | S2 | 51.7 | 300 |
| 6-4 | P1 | 89.3 | 159.0 | 18 | 40 | S2 | 51.7 | 300 |
| 6-5 | — | 0 | 247.0 | 0 | 25 | S3 | 53.0 | 300 |
| 6-6 | — | 0 | 247.0 | 0 | 40 | S3 | 53.0 | 300 |
| 6-7 | — | 0 | 248.3 | 0 | 25 | S2 | 51.7 | 300 |
| 6-8 | — | 0 | 248.3 | 0 | 40 | S2 | 51.7 | 300 |
| 6-9 | P1 | 149 | 99.5 | 30 | 40 | S2 | 51.7 | 300 |

TABLE 7

Measured viscosity values for the different mixture compositions of Table 6, as function of the agitation time

| Mixture nb. | Dry solids of the mixture (%) | pH | Viscosity of the mixture (mPas) | Viscosity after 30 min mixing (mPas) | Viscosity after 120 min mixing (mPas) |
|---|---|---|---|---|---|
| 6-1 | 30 | 4.8 | 73 | 72 | 72 |
| 6-2 | 30 | 4.7 | 91 | 140 | 139 |
| 6-3 | 30 | 5.3 | 1380 | 3200 | 3860 |
| 6-4 | 30 | 5.1 | 8300 | 13500 | 15800 |
| 6-5 | 15 | 4.8 | ~1500 | gel | gel |
| 6-6 | 15 | 4.8 | gel | gel | gel |
| 6-7 | 15 | 4.5 | gel | gel | 37000 |
| 6-8 | 15 | 4.5 | gel | 63500 | 15200 |
| 6-9 | 40 | 5.3 | 960 | 1900 | 1960 |

The results show that the viscosity of the starch/polyelectrolyte mixture increases, when temperature increases. Viscosity increase can be retarded by increasing the polymer concentration, as will be shown in Experiment 7. Mixtures from 6-5 to 6-8, which do not contain any cationic polymer, form immediately high viscous gels. Viscosity of the formed gels cannot be measured, and compositions cannot be easily handled in practice in large quantities.

Experiment 7

Effect of polymer concentration to the viscosity of starch/polyelectrolyte mixtures The following materials are used in the experiment 7:

Starch, S1: as described above.

Synthetic cationic polymers:

P1, P2, P3, P4: as defined above.

P5: aqueous solution of co-polymer of adipic acid and diethylenetriamine, dry solids content 40.2%, viscosity 55 mPas, determined charge density 4.3 meq/g dry product at pH 3, determined as described above.

P6: aqueous solution of cationic polyacrylamide, copolymer of acrylamide and DADMAC, dry solids content 26.1%, pH 3.6, viscosity 10 mPas, determined charge density 0.32 meq/g dry product at pH 3, determined as described above.

The mixtures are prepared according to Table 8 in the following manner:

Aqueous polymer solution is diluted with water at about 25° C. Starch is then dosed into the obtained polyelectrolyte solution, pH of the mixture is adjusted between 4.5-7, if necessary, with 25% sulphuric acid and mixed for 5 min, mixing speed 300 rpm. Viscosity of the mixture is measured. The mixture is further mixed, mixing speed 100 rpm. Viscosity of the mixture is measured again after 30 min of mixing and 2 h of mixing. Measured viscosity values are shown in Table 3. Concentration of cationic starch and synthetic polymer is 15% in all the mixtures, except in mixture 7-11, which does not contain any polymer. Measured viscosity values are shown in Table 9.

The results show that cationic polymer decreases effectively dissolution of cationic starch, even low cationic polyacrylamide is effective as a dispersing agent. Mixture 7-11, which does not contain any cationic polymer, forms immediately high viscous gel. Viscosity of the formed gel cannot be measured, and composition cannot be easily handled in practice in large quantities.

TABLE 8

Mixtures in Experiment 7.

| Mixture nb. | P-product | P-product dosage (g) | Water (g) | Conc of P before S-product dosage (%) | S-product | S-product dosage (g) | Total mixture (g) | Dry solids of the mixture (%) | pH |
|---|---|---|---|---|---|---|---|---|---|
| 7-1 | P1 | 89.3 | 158.0 | 18.2 | S1 | 52.7 | 300 | 30 | 5.5 |
| 7-2 | P3 | 109.2 | 138.1 | 18.2 | S1 | 52.7 | 300 | 30 | 5.1 |
| 7-3 | P2 | 179.3 | 68.0 | 18.2 | S1 | 52.7 | 300 | 30 | 5.8 |
| 7-4 | P4 | 144.2 | 103.1 | 18.2 | S1 | 52.7 | 300 | 30 | 5.6 |
| 7-5 | P1 | 74.4 | 199.2 | 13.7 | S1 | 26.3 | 300 | 20 | 5.3 |
| 7-6 | P3 | 91.0 | 182.6 | 13.7 | S1 | 26.3 | 300 | 20 | 5.1 |
| 7-7 | P2 | 149.4 | 124.3 | 13.7 | S1 | 26.3 | 300 | 20 | 5.6 |
| 7-8 | P4 | 120.2 | 153.5 | 13.7 | S1 | 26.3 | 300 | 20 | 5.3 |
| 7-9 | P5 | 145.9 | 127.7 | 13.7 | S1 | 26.3 | 300 | 20 | 4.5 |

TABLE 8-continued

Mixtures in Experiment 7.

| Mixture nb. | P-product | P-product dosage (g) | Water (g) | Conc of P before S-product dosage (%) | S-product | S-product dosage (g) | Total mixture (g) | Dry solids of the mixture (%) | pH |
|---|---|---|---|---|---|---|---|---|---|
| 7-10 | P6 | 143.7 | 130.0 | 13.7 | S1 | 26.3 | 300 | 20 | 4.5 |
| 7-11 | — | 0 | 247.3 | 0 | S1 | 52.7 | 300 | 15 | 6.3 |

TABLE 9

Measured viscosity values for the different mixture compositions of Table 7, as function of the agitation time

| Mixture nb. | Dry solids of the mixture (%) | pH | Viscosity of the mixture (mPas) | Viscosity after 30 min mixing (mPas) | Viscosity after 120 min mixing (mPas) |
|---|---|---|---|---|---|
| 7-1 | 30 | 5.5 | 71 | 74 | 105 |
| 7-2 | 30 | 5.1 | 216 | 218 | 256 |
| 7-3 | 30 | 5.8 | 315 | 328 | 384 |
| 7-4 | 30 | 5.6 | 235 | 197 | 215 |
| 7-5 | 20 | 5.3 | 27 | 30 | 41 |
| 7-6 | 20 | 5.1 | 152 | 154 | 177 |
| 7-7 | 20 | 5.6 | 290 | 296 | 329 |
| 7-8 | 20 | 5.3 | 120 | 121 | 125 |
| 7-9 | 20 | 4.5 | 93 | 157 | 289 |
| 7-10 | 20 | 4.5 | 10 | 12 | 16 |
| 7-11 | 15 | 6.3 | gel | gel | gel |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. Method for dissolving cationic starch, which method comprises
   obtaining an aqueous polyelectrolyte solution comprising a synthetic cationic polymer, which has a charge density value of at least 0.1 meq/g, determined at pH 3, the concentration of the synthetic cationic polymer in the polyelectrolyte solution being >2.5 weight-%,
   bringing the aqueous polyelectrolyte solution together with cationic starch having a degree of substitution, DS, >0.1, the starch being in form of particulate material having dry solids content >60 weight-%, and
   dissolving the cationic starch in the polyelectrolyte solution by heating and/or mixing.

2. Method according to claim 1, characterised in that the aqueous polyelectrolyte solution comprising synthetic cationic polymer has a charge density value of 0.1 -23 meq/g, determined at pH 3.

3. Method according to claim 1, characterised in that the concentration of the synthetic cationic polymer in the polyelectrolyte solution, before the polyelectrolyte solution is brought together with cationic starch, is >2.5 weight-%.

4. Method according to claim 3, characterised in that the concentration of the cationic polymer, before the polyelectrolyte solution is brought together with cationic starch, is in the range of 2.5 -40 weight-%.

5. Method according to claim 1, characterised in that the synthetic cationic polymer has an average molecular weight in the range of 1 000-2 500 000 Dalton.

6. Method according to claim 1, characterised in selecting the synthetic cationic polymer from a group consisting of: copolymers of dialkylamine(s) and epichlorohydrin; polydiallylmethylammonium chloride (poly-DADMAC); poly (acrylamide-N-propyltrimethylammonium chloride (poly-APTAC); poly(methacrylamide-N-propyltrimethyl-ammonium chloride (poly-MAPTAC); polyamidoamine epichlorohydrin resin; polyethyleneimine; polyvinylformamide/polyvinylamine; cationic polyacrylamides a copolymer of acrylamide and DADMAC; a copolymer of acrylamide and APTAC; a copolymer of acrylamide and MAPTAC; and any of the mixtures of the said polymers.

7. Method according to claim 1, characterised in selecting the cationic starch from a group consisting of: potato starch, rice starch, corn starch, waxy corn starch, wheat starch, barley starch, sweet potato starch, tapioca starch and any of their mixtures.

8. Method according to claim 1, characterised in selecting a cationic starch which has an amylopectin content of >70%.

9. Method according to claim 1, characterised in using cationic starch, which has a degree of substitution, DS, in the range from 0.1 to 1.0.

10. Method according to claim 1, characterised in selecting a cationic starch which is non-degraded and/or free of cross-linkages.

11. Method according to claim 1, characterised in using cationic starch, where at least 75 weight-% of the starch material has an average molecular weight (MW) over 5 000 000 Dalton.

12. Method according to claim 1, characterised in using cationic starch having a charge density of 0.56-3.2 meq/g pure cationic starch.

13. Method according to claim 1, characterised in dispersing first the cationic starch into the polyelectrolyte solution in order to prevent formation of viscous gel lumps.

14. Method according to claim 1, characterised in adjusting the temperature of the polyelectrolyte solution to a temperature <40° C. before the addition of the cationic starch.

15. Method according to claim 1, characterised in dissolving the cationic starch in the polyelectrolyte solution by using steam cooking, at temperature of about 110° C. to about 180° C., or by using pot-cooking.

16. Method for dissolving cationic starch, which method comprises
   obtaining an aqueous polyelectrolyte solution comprising a synthetic cationic polymer, which has a charge density value of at least 0.1 meq/q, determined at pH 3, the concentration of the synthetic cationic polymer in the polyelectrolyte solution being >2.5 weight-%,
   bringing the aqueous polyelectrolyte solution together with cationic starch having a degree of substitution, DS, >0.1, and dissolving the cationic starch in the polyelectrolyte solution by using steam cooking, at the temperature of 110-180° C., or by using pot-cooking.

* * * * *